US006123863A

United States Patent [19]

Shimomura et al.

[11] Patent Number: 6,123,863
[45] Date of Patent: Sep. 26, 2000

[54] PROCESS FOR PRODUCING LIQUID-JET RECORDING HEAD, LIQUID-JET RECORDING HEAD PRODUCED THEREBY, AND RECORDING APPARATUS EQUIPPED WITH RECORDING HEAD

[75] Inventors: Akihiko Shimomura, Yokohama; Isao Imamura, Kawasaki; Shoji Shiba, Sagamihara, all of Japan

[73] Assignee: Canon Kabushiki Kaisha, Tokyo, Japan

[21] Appl. No.: 08/772,122

[22] Filed: Dec. 20, 1996

[30] Foreign Application Priority Data

Dec. 22, 1995 [JP] Japan .................................... 7-334935

[51] Int. Cl.[7] ........................... G11B 5/127; G01D 15/00; G01D 15/16

[52] U.S. Cl. ................................................ 216/27; 438/21

[58] Field of Search .............................. 156/655; 216/83, 216/27; 438/21, 52, 53

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,608,577 | 8/1986 | Hori | 346/140 R |
| 4,657,631 | 4/1987 | Noguchi | 156/655 |
| 4,723,129 | 2/1988 | Endo et al. | 346/1.1 |
| 4,740,796 | 4/1988 | Endo et al. | 346/1.1 |
| 5,436,650 | 7/1995 | Kobayashi et al. | 347/63 |

FOREIGN PATENT DOCUMENTS

| | | |
|---|---|---|
| 54-56847 | 5/1979 | Japan . |
| 59-123670 | 7/1984 | Japan . |
| 59-138461 | 8/1984 | Japan . |
| 60-71260 | 4/1985 | Japan . |
| 61-154947 | 7/1986 | Japan . |
| 4-10940 | 1/1992 | Japan . |
| 4-10941 | 1/1992 | Japan . |
| 6-286149 | 10/1994 | Japan . |

OTHER PUBLICATIONS

Weast, Ph. D., Robert C. "CRC Handbook of Chemistry and Physics, 58th Edition", p. C–456, Jan. 1977.

*Primary Examiner*—Jeffrie R Lund
*Assistant Examiner*—Alva C Powell
*Attorney, Agent, or Firm*—Fitzpatrick, Cella, Harper & Scinto

[57] ABSTRACT

A process for producing a liquid-jet recording head comprises the steps of providing a solid layer of a photosensitive material in a pattern of a liquid path on a substrate, providing at least a portion of a liquid path forming material on the substrate having the solid layer, and removing the solid layer from the substrate, wherein the solid layer is removed by use of at least one of methyl lactate, ethyl lactate, and butyl lactate, or a solvent which contains as a main component at least one of methyl lactate, ethyl lactate, and butyl lactate.

3 Claims, 5 Drawing Sheets

PROCESS FOR PRODUCING LIQUID-JET RECORDING HEAD, LIQUID-JET RECORDING HEAD PRODUCED THEREBY, AND RECORDING APPARATUS EQUIPPED WITH RECORDING HEAD

BACKGROUND OF THE INVENTION

1. Field of the Invention

The present invention relates to a process of producing a liquid-jet recording head for forming recording liquid droplets in an ink-jet recording system, a liquid-jet recording head produced by the process, and a recording apparatus equipped with the recording head.

2. Related Background Art

A liquid-jet recording head employed for an ink-jet recording system (liquid-jet recording system) has generally a fine discharge opening for ejecting a recording liquid (hereinafter referred to as an "orifice"), a liquid path, and an energy generation device for generating liquid ejection energy provided in a part of the liquid path. In a known process for producing such a liquid-jet recording head, a fine groove is formed on a plate of glass, metal or the like by a working method such as cutting and etching, and thereafter another suitable plate is bonded to cover the grooved plate.

However, conventional processes for the liquid-jet recording head production involve problems that the liquid path cannot readily be made uniform in liquid flow resistance owing to roughness of the liquid path wall worked by cutting or distortion of the liquid path by a difference in the etching ratio, tending to cause variation in the recording liquid discharging characteristics of the resulting liquid-jet recording head, and that breaks and cracks are liable to occur during cutting working, whereby the yield of production is low. The etching working includes many production steps to result in high production cost disadvantageously. Moreover, conventional processes for the recording head production have commonly disadvantages that the positional registration is difficult in bonding together the plate having a groove for the liquid path and the cover plate having a driving element such as a piezoelectric element and an electrothermal transducer for generating the liquid droplet discharge energy, which is not suitable for mass-production.

The liquid-jet recording head is usually brought into continual contact with the recording liquid in use conditions. Therefore, the materials for constructing the liquid-jet recording head should be resistant to the recording liquid not to cause deterioration in mechanical strength and not to impair the recording suitability of the recording liquid by releasing a detrimental component to the recording liquid. For conventional recording heads, the suitable material cannot necessarily be employed owing to restriction in the working method.

For solving the above problems in production of a liquid-jet recording head, a method is disclosed which comprises steps of providing a solid layer in a liquid path pattern on a substrate, applying a liquid path forming material to form a liquid path wall on the substrate having the above solid layer, and removing the solid layer from the substrate (JP-A-61-154947). This disclosed process enables production of a liquid-jet recording head with less variation of the discharge opening shape with high resistance to contamination by a foreign matter.

The ink (recording liquid) for ink-jet apparatus (liquid-jet recording apparatus) is desired to have higher water resistance to keep print quality against water depositing on the recording medium. For high water resistance of the ink, one method is use of a dye which is soluble only in an aqueous alkaline solution. However, when such a highly alkaline ink is used in the aforementioned liquid-jet recording head produced according to the above JP-A-61-154947, the ink tends to cause cracks of the liquid path forming material or separation thereof from the substrate.

The inventors of the present invention found that this phenomenon is caused by the after-effect of the dissolving liquid having been used in the solid layer removal step in the aforementioned head production process. Specifically, the dissolving liquid used in the solid layer removal step includes halogen-containing hydrocarbons, ketones, esters, aromatic hydrocarbons, ethers, alcohols, N-methylpyrrolidone, dimethylformamide, phenol, water, and strong alkali-containing water as described in the aforementioned JP-A-61-154947. From the above dissolving liquids, those are selected which is capable of removing quickly the solid layer without adverse effect such as swelling and dissolution of the resin material for forming the liquid path wall. However, few dissolution liquids satisfy all of the above requirements. The actually used dissolving liquids swell a little the resin material for formation of the liquid path wall. Therefore, the adhesiveness or the strength of the liquid path wall is locally impaired although the recording heads produced can be used without problem. The highly alkaline ink, which tends to swell the resin of the liquid path forming material of the liquid-jet recording head, is liable to cause separation of the liquid path wall from the substrate or to cause crack formation in the liquid path wall at the portion of low adhesiveness or low strength of the liquid path wall.

SUMMARY OF THE INVENTION

The present invention has been made in consideration of the aforementioned problems.

An object of the present invention is to provide a novel process for producing a liquid-jet recording head at a low cost with high precision and high reliability.

Another object of the present invention is to provide a liquid-jet recording head which does not affect the recording liquid and is not affected thereby, and has high mechanical strength and high chemical resistance.

A further object of the present invention is to reduce the limitation to the liquid-jet recording apparatus by reducing the restriction in selection of the liquid path forming material and by broadening the margins of the process conditions.

A still further object of the present invention is to provide a process for producing a liquid-jet recording head in view of safety.

The process for producing a liquid-jet recording head of the present invention comprises the steps of providing a solid layer of a photosensitive material in a pattern of a liquid path on a substrate, providing at least a portion of a liquid path forming material on the substrate having the solid layer, and removing the solid layer from the substrate, wherein the solid layer is removed by use of at least one of methyl lactate, ethyl lactate, and butyl lactate, or a solvent which contains as a main component at least one of methyl lactate, ethyl lactate, and butyl lactate. The photosensitive material includes positive resists which can be solubilized by active ray. The liquid path forming material includes epoxy resins. The solid layer may be made from a positive resist, and simultaneously the liquid path forming material may be an epoxy resin.

The present invention also provides a liquid-jet recording head produced by the above process. The recording head may have, as an ink discharge energy generating element, an electrothermal transducer which causes a change of the state of the ink by heat generated by application of electric energy to discharge the ink. The recording head may be of a full line type which has plural ejection outlets over the entire breadth of a recording region of a recording medium.

The present invention further provides a recording apparatus which comprises at least the recording head having an ink discharge opening for discharging an ink in opposition to a recording face of a recording medium, and a member for setting the recording head thereon.

DESCRIPTION OF THE PREFERRED EMBODIMENTS

The present invention is described in detail, by reference to drawings as necessary.

FIGS. 1 to 6 are schematic drawings for explaining the basic embodiment of the present invention. FIGS. 1 to 6 shows an example of the construction and the production steps of the liquid-jet recording head of the present invention. In this example, the liquid-jet recording head has two orifices. Naturally, the construction and the production process are similar in the case of a liquid-jet recording head having more orifices.

Figure 1:
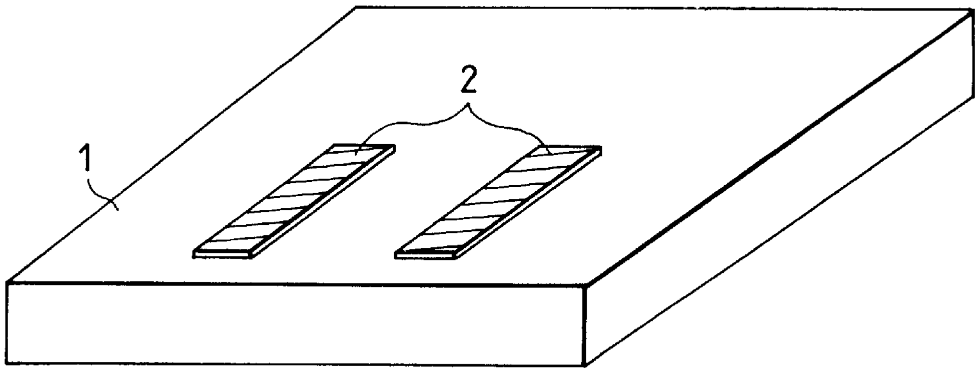
FIG. 1 is a schematic perspective view of a substrate before formation of a solid layer.

In this embodiment, a substrate 1 employed is made of glass, ceramic, plastic, metal, or the like as shown in FIG. 1, a schematic perspective view of a substrate before formation of a solid layer.

The substrate 1 is not specially limited in its shape, material, and so forth, provided that it is capable of serving as a part of the liquid path forming materials and capable of supporting the solid layer and the liquid path forming material on lamination. Plural liquid discharge energy generating elements 2 such as electrothermal transducers, piezoelectric elements, or the like are provided as desired on the substrate 1 (two elements in FIG. 1). The liquid discharge energy generating elements 2 apply energy to an ink to discharge recording liquid droplets and conduct recording. For example, an electrothermal transducer employed as the discharge energy generating element 2 heats the recording liquid around it to apply discharging energy; and a piezoelectric element employed as the discharge energy generating member 2 generates the discharging energy by mechanical vibration of the element.

To the elements 2, control signal input electrodes (not shown in the drawings) are connected to drive the elements. Generally, the element has a functional layer such as a protecting layer to improve durability of the discharge energy generating elements. In the present invention also, such a functional layer may naturally be provided without inconvenience. Although the discharge energy generating elements are provided prior to formation of the liquid paths in this embodiment, the elements may be provided at any desired step in the head production.

Figure 2A:
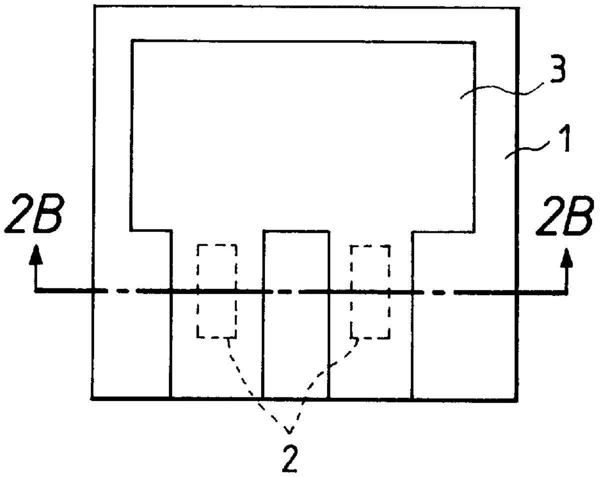
FIG. 2A is a schematic plan view of the substrate after formation of a solid layer.
Figure 2B:
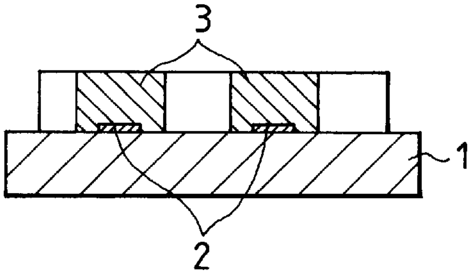
FIG. 2B is a schematic sectional view of the substrate after formation of the solid layer of FIG. 2A taken along line 2B—2B.

In the following step, a solid layer 3 is formed on the predetermined portion to provide the liquid paths on the substrate 1 having the discharge energy generating elements 2 as shown, for example, in FIGS. 2A and 2B: FIG. 2A is a schematic plan view of the substrate after formation of the solid layer, and FIG. 2B is a schematic sectional view of the substrate after formation of the solid layer, taken along the line 2B—2B of FIG. 2A.

For the material for the solid layer 3, the positive resists are suitable which are solubilized on irradiation of active rays. The reasons therefor are as follows:

(1) The positive resists are used in IC production and printed substrate production by photolithography, and allows formation of the solid layer with satisfactory positional registration and reproducibility of the pattern shape, being especially suitable for multiple nozzle formation.

(2) The positive resists are highly removable, especially becoming more removable by irradiation of active rays, unlike negative resists which become high molecular on irradiation of active rays, not being completely removable and being liable to cause soiling of interior of the nozzles.

The specific examples include positive dry film resists such as OZATECR-225 (trade name; mfd. by Hoechst Japan Co., Ltd.), liquid positive resists such as OZATECPL-268 (trade name; mfd. by Hoechst Japan Co., Ltd.), EL series (trade name; mfd. by Japan Synthetic Rubber Co., Ltd.), OFPR series (trade name; mfd. by Tokyo Ohka Co., Ltd.), PMER-P series (trade name; mfd. by Tokyo Ohka Co., Ltd.), ZPP series (trade name; mfd. by Nippon Zeon Co., Ltd.), and ODUR series (trade name; mfd. by Tokyo Ohka Co., Ltd.).

The solid layer is formed from the solid layer material on the substrate. A dry film type material for the solid layer may be laminated by means of a hot roll laminator commonly employed in production of printed plates. A liquid type material for the solid layer may be applied onto the substrate by spin coating, roll coating, curtain coating, screen printing, or a like method. Since the solvent is removed after the application, the liquid type material is applied in an amount to offset the thickness decrease by the solvent removal.

On the substrate 1 having thereon a positive resist layer as the solid layer material, a photomask having a pattern corresponding to the intended liquid path is superposed with positional registration, and the solid layer material is irradiated by active rays through the photomask. Then the exposed portion of the solid layer material is developed with a developer such as caustic soda to form the solid layer 3. The solid layer 3 may further be irradiated by ultraviolet rays before the subsequent lamination of a liquid path forming material 4 for the purpose of increasing removability of the solid layer 3 in the later step.

Figure 3:
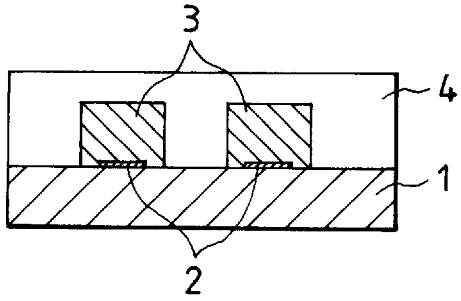
FIG. 3 is a schematic sectional view of the substrate after formation of a layer of a liquid path forming material.

Onto the substrate 1 having the solid layer 3 formed thereon, a liquid path forming material 4 is provided as a layer to cover the solid layer 3 as shown in FIG. 3. FIG. 3 is a schematic sectional view of the substrate after formation of the layer of the liquid path forming material, taken at the same position as 2B—2B in FIG. 2A.

The liquid path forming material should be capable of covering the solid layer 3, and is preferably selected from the materials excellent in adhesiveness to the substrate, mechanical strength, dimensional stability, and corrosion resistance, as a structuaral material for forming a liquid path of a liquid-jet recording head. Preferred materials therefor are curable materials including liquid materials curable by heating, ultraviolet ray irradiation, or electron beam irradiation. Specific examples include epoxy resins, acrylic resins, diglycol dialkyl carbonate resins, unsaturated polyester resins, polyurethane resins, polyimide resins, melamine resins, phenol resins, urea resins, and so forth. Of these resins, epoxy resins are especially preferred.

The curable liquid material as the liquid path forming material is provided in the form of a layer onto the substrate in a desired thickness, for example, by application by a known method such as curtain coating, roll coating, and spray coating. In the application, the material is preferably deaerated preliminarily, and is applied by preventing formation of gas bubbles.

Figure 4:
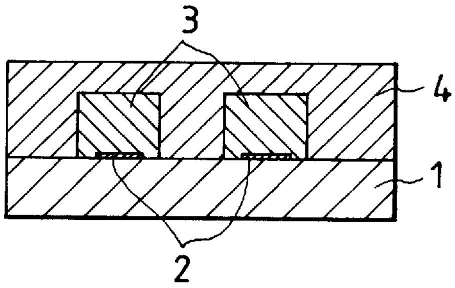
FIG. 4 is a schematic sectional view of the substrate after cure of a curable liquid material used as the liquid path forming material.

For example, in layer formation of the above curable liquid material as the liquid path forming material 4 in a manner shown in FIG. 3, the liquid curable material is held not to flow out or move, by placing a pressing plate on the top if necessary, and is cured under prescribed conditions (FIG. 4).

Then the solid layer 3 is removed from the substrate having thereon a layered structure of the solid layer 3 and the layer of the liquid path forming material 4 to form liquid paths. For the solid layer removal in the present invention, a solvent (dissolving liquid) is employed which is selected from methyl lactate, ethyl lactate, butyl lactate, and solvents mainly composed of methyl lactate, ethyl lactate, or butyl lactate.

The reasons for employing the solvent selected from methyl lactate, ethyl lactate, butyl lactate, and solvents mainly composed of methyl lactate, ethyl lactate, or butyl lactate are as follows. (1) The solvent has high ability of removing the solid layer. In particular, a positive resist, when used as the solid layer, can be removed effectively by the above specified solvent in comparison with other solvents. (2) The solvent swells little the resin of the liquid path forming material. (3) The solvent is low volatile, resulting in less volatilization loss, and being desirable from the standpoint of industrial hygiene. (4) The solvent has a high flash point, being less liable to cause fire accident. (5) The solvent is not ionic, corroding less the wiring material such as aluminum, and damaging less the liquid path forming material and the organic materials for protection of wiring. (6) The solvent is safe in handling as understood from its practical use as a food additive. Although some polar solvents satisfy the above requirements except for the damage to organic materials and the safety in handling, methyl lactate, ethyl lactate, and butyl lactate are selected since they satisfy all of the above requirements.

An additional other solvent may be combinedly used with the aforementioned methyl lactate, ethyl lactate, and butyl lactate in such an amount that the above advantages are not reduced. The additional solvent includes dimethylsulfoxide, halogenated hydrocarbons, ethers, alcohols, N-methylpyrrolidone, dimethylformamide, phenol, ethylene glycol monoethyl ether, water, strong alkali-containing water. A surfactant may be added to the solvent if necessary.

The method for removal of the solid layer 3 is not specially limited. For example, the removal is conducted by immersion of the substrate in the above solvent with ultrasonic wave treatment, spraying, heating, agitation, or the like accelerating means as necessary.

Figure 5:
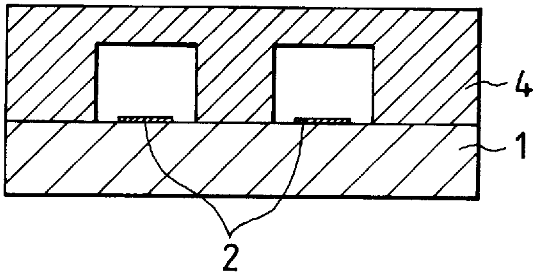
FIG. 5 is a schematic sectional view of the substrate after removal of the solid layer.
Figure 6:
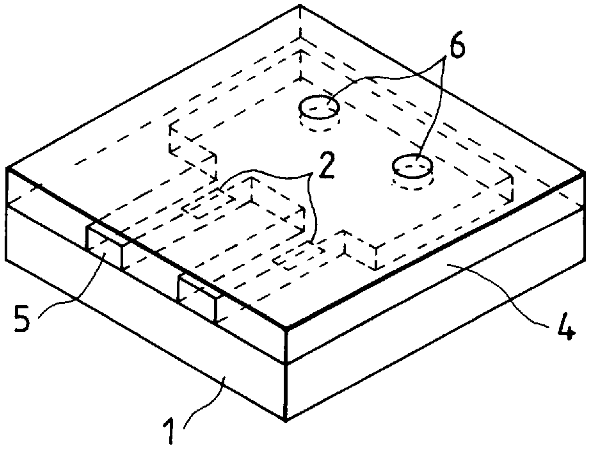
FIG. 6 is a schematic perspective view of a completed liquid-jet recording head.

FIG. 5 is a schematic sectional view of the liquid-jet recording head after removal of the solid layer 3, taken at the same position as 2B—2B in FIG. 2A. FIG. 6 is a schematic perspective view of the liquid-jet recording head prepared by providing liquid supply openings 6 prior to the solid layer removal, and subsequently removing the solid layer.

As described above, a liquid-jet recording head is constructed by forming a desired liquid path at a desired position on a substrate 1 having discharge energy generating elements 2.

To obtain an image of high quality with an ink-jet recording head, the recording liquid droplets should be discharged in a constant droplet volume at a constant discharge rate through a discharge opening. For this purpose, JP-A-4-10940, JP-A-4-10941, and JP-A-4-10942 disclose a method in which driving signals are transmitted to an ink discharge pressure-generating element (electrothermal transducing element) in correspondence with recording information to allow the electrothermal transducing elements to generate thermal energy giving abrupt temperature rise exceeding the nuclear boiling point of the ink. This thermal energy causes bubble formation in the ink, and the pressure caused by the volume increase by the bubble formation discharges an ink droplet through an ink discharge opening to the outside.

In this method, in the ink-jet recording head, the distance between the electrothermal transducing element and the orifice is preferably shorter (hereinafter the distance being referred to as "OH distance"). In the above method, the discharging volume substantially depends on the OH distance. Therefore, the OH distance should be made precise with high reproducibility.

JP-A-6-286149 discloses a process for producing ink jet recording head in which the OH distance is made short and precise. The process comprises the steps of forming an ink path pattern with a soluble resin on a substrate, forming a coating resin layer for forming an ink path wall on the patterned soluble resin layer by solvent-coating of a solution of an epoxy resin-containing coating resin which is solid at room temperature, forming an ink discharge opening in the coating resin layer above an ink discharge pressure-generating element, and removing the soluble resin by dissolution.

The present invention is more effective in improving the process for producing an ink jet recording head of the aforementioned JP-A-6-286149.

The present invention is effective, in particular, for ink jet recording heads and ink jet recording apparatuses employing thermal energy to form flying liquid droplets and effect recording.

The typical constitution and the principle of the ink jet system are shown in, for example, U.S. Pat. No. 4,723,129, and U.S. Pat. No. 4,740,796. This system can be applied to both the on-demand type and the continuous type. In an on-demand type ink jet system, a driving signal is applied to an electrothermal transducer arranged in correspondence with a sheet or a liquid path holding a liquid (ink) to generate thermal energy to cause abrupt temperature rise and to cause film boiling on the heating face of the recording head, and thereby bubbles are formed in the liquid (ink) in one-to-one correspondence with the driving signal. The growth and constriction of the bubble drives the liquid (ink) to discharge through a discharge opening to form at least one liquid droplet. The driving signal is preferably in a pulse shape since the growth and constriction of the bubbles occur instantaneously and timely to discharge the ink with good response.

Suitable driving pulse signals are described in, e.g., U.S. Pat. Nos. 4,463,359 and 4,345,262. The recording can be conducted more satisfactorily by employing the conditions disclosed in U.S. Pat. No. 4,313,124 regarding temperature rise rate of the aforementioned heating face.

The present invention is applicable to the recording heads constituted of combination of a discharge opening, a liquid path type, and an electrothermal transducer (linear liquid path, or a right-angled liquid path type) such as disclosed in the aforementioned patent publications, and also to the recording head having a heat actuating portion arranged at a curved region as disclosed in U.S. Pat. Nos. 4,558,333 and 4,459,600.

The present invention is also effective for the constitution having a slit common to plural electrothermal transducer as a discharge portion as disclosed in JP-A-59-123670 as well as the constitution having an opening for absorbing pressure waves of thermal energy correspondingly to a discharge portion as disclosed in JP-A-59-138461.

The present invention is also effective for full-line type recording heads having a length corresponding to the maximum recording breadth of a recording medium for the recording apparatus, including those having combination of plural recording heads over the full recording breadth, and those having an integrally formed single recording head of the full recording breadth.

Further, the present invention is effective for an exchangeable tip type of recording head which comes to be electrically connected to the main apparatus body and to be supplied with ink automatically on setting onto the main apparatus body, and for cartridge types of recording head having an ink tank integrally.

A recovery means for the recording head and a supplemental and auxiliary means additionally provided as components, of the recording apparatus of the present invention are desirable for stabilizing the effects of the present invention. The specific examples of the above means for the recording head include a capping means, a cleaning means, a pressurizing or sucking means, preliminary heating means such as an electrothermal transducer or its combination with another heating element, and a preliminary discharge mode for conducting ink discharge separately from recording.

The recording may be conducted not only with a single color such as a black color but also with multiple colors by use of combination of plural recording heads or an integrally formed single head. The present invention is highly effective for a recording apparatus having at least one of a multiple color system of different colors and a full color system using color mixing. In the above description, the ink is assumed to be in a liquid state. However, the ink may be the one which solidifies below room temperature and softens or becomes a liquid at room temperature, or an ink which becomes a liquid on recording signal application in ink jet recording since the ink is controlled usually to be at a temperature ranging from 30 to 70° C. in ink jet recording to keep the viscosity of the ink in a stable discharging range.

In the present invention, an ink can be used which becomes liquid on application of thermal energy, being exemplified by an ink which liquefies on application of thermal energy as recording signals and can be discharged in a state of a liquid ink, or which has begun to solidify on reaching a recording medium, for the purpose of either utilizing the thermal energy for the phase change from a solid to a liquid of the ink to thereby prevent temperature rise by the thermal energy, or employing an ink which is solid at a free state to prevent evaporation of the ink. Such an ink may be held in a liquid or solid state in a hollow portion or penetrating holes of a porous material sheet and be placed in opposition to an electrothermal transducer as described in JP-A-54-56847 and JP-A-60-71260. The present invention is the most effective for the aforementioned film boiling system.

The recording apparatus of the present invention may be used, separately or integrally, as an image output terminal of an information processing apparatus such as a word processor and a computer, and as a copying machine combined with a reader, or a facsimile apparatus having an information transmitting-and-receiving function.

The present invention is described below in more detail by Examples.

EXAMPLE 1

A liquid-jet recording head having the constitution of FIG. 6 was prepared through the steps shown in FIGS. 1, 2A, 2B, 3, 4, 5 and 6.

Firstly, onto a glass substrate having formed thereon electrothermal transducers (material: $HfB_2$) as the liquid discharge energy generating elements, a positive resist, OZATECPL-268 (trade name; mfd. by Hoechst Japan Co., Ltd.), was applied as a photosensitive layer by spin coating for 40 seconds at 2700 rpm in a dry thickness of 25 $\mu$m. Onto this photosensitive layer, a mask having a pattern corresponding to the one shown in FIG. 6 was superposed. The substrate was irradiated by ultraviolet rays through the mask covering the portion for the intended liquid path at a dose of 1000 mJ/cm$^2$.

The pattern corresponded to 128 nozzles at a density of 16 nozzles per mm, and a liquid path length of 1 mm. Then, development was conducted by spraying aqueous 1% sodium hydroxide solution to form a solid relief layer of about 25 $\mu$m thick in the portion of the intended liquid path on the glass substrate having the electrothermal transducers.

Then the solid layer was further irradiated by ultraviolet rays at a dose of 5000 mJ/cm$^2$ to increase the removability of the layer.

Thereon, a layer of a curable material was formed which comprised Adeka Optomer KRM-4210 (trade name, epoxy resin produced by Asahi Denka Kogyo K.K.), Epolite 3002 (trade name, epoxy resin produced by Kyoeisha Yushi Kagaku Kogyo K.K.), and Adeka Optomer SP-170 (trade name, photopolymerization initiator produced by Asahi Denka Kogyo K.K.). The layer formation was conducted by coating with an applicator in a thickness of 50 $\mu$m.

The coated material was cured by irradiation with ultraviolet rays at a dose of 2000 mJ/cm$^2$. The layered structure was cut at the intended orifice position to expose the end face of the solid layer of the positive resist.

The cut substrate having the exposed end face of the solid layer was washed in methyl lactate in an ultrasonic washing vessel for 10 minutes and then dried.

In such a manner, 20 liquid-jet recording heads were prepared. In any of the recording heads, no residue of the solid layer was found in the liquid paths. The formed orifices had the same shape as the developed solid layer before the lamination of the liquid path forming material. No damage such as swelling, cracking, or separation from the substrate was caused in the liquid path forming material. The prepared liquid-jet recording heads were mounted on a recording apparatus, and were employed in recording with an ink-jet ink composed of pure water, glycerin, diethylene glycol, urea, sodium hydroxide, isopropyl alcohol, and Direct Black 154 (water-soluble black dye) in the weight ratio of 76:5:5:5:1:4:4. Consequently, printing could be conducted stably.

EXAMPLE 2

Liquid-jet recording heads having the constitution of FIG. 6 were prepared in a similar manner as in Example 1.

Firstly, onto a glass substrate having piezoelectric elements (material: $PbTiO_3$) as the liquid discharge energy generating elements bonded thereon, a liquid positive resist, PMER-AR900 (trade name; mfd. by Tokyo Ohka Co., Ltd), was applied as a photosensitive layer by a spinner at 2500 rpm for 50 seconds, and was dried for 20 minutes. Onto this photosensitive layer, a mask having a pattern of 24 nozzles at a nozzle pitch of 0.25 mm and a liquid path length of 3 mm was superposed. The substrate was irradiated by ultraviolet rays through the mask covering the portion for the intended liquid path at a dose of 4000 mJ/cm$^2$. Then, development was conducted by spraying aqueous 1% sodium hydroxide solution to form a solid relief layer.

Then the solid layer was further irradiated by ultraviolet rays at a dose of 5000 mJ/cm$^2$ to increase the removability of the layer.

The subsequent steps were conducted in the same manner as in Example 1. In such a manner, 20 liquid-jet recording heads were prepared. In any of the recording heads, no residue of the solid layer was found in the liquid paths. No damage such as swelling, cracking, or separation from the substrate was found in the liquid path constructing material. The prepared liquid-jet recording heads were employed in recording using the same ink jet ink as in Example 2. Consequently, printing could be conducted stably.

EXAMPLE 3

Figure 9:
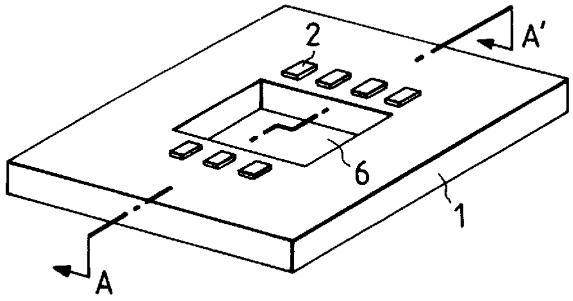
FIGS. 9, 10, 11, 12, 13, 14 and 15 are drawings for explaining the steps of the production process of Example 3.

Liquid-jet recording heads were prepared according to the process disclosed in JP-A-6-286149. FIG. 9 is a perspective view illustrating a substrate used in this Example, and FIGS. 10, 11, 12, 13, 14 and 15 are views showing the preparation steps using the substrate of FIG. 9, based on a sectional view taken along A–A' in FIG. 9.

Firstly, onto a silicon substrate 1 having electrothermal transducers 2 (heater made of a material: $HfB_2$) formed thereon as the liquid discharge energy generating elements, a blast mask was placed, and a through hole 6 for ink supply was formed by sandblasting (FIG. 9).

Separately, poly(methyl isopropenyl ketone) (ODUR-1010, produced by Tokyo Ohka Co., Ltd.) was applied on PET and dried to form a dry film as a soluble resin layer 3, which was then transferred onto the substrate 1 by lamination. The used ODUR-1010 was concentrated before the application since ODUR-1010 has a low viscosity and is not suitable for thick film formation.

Figure 10:
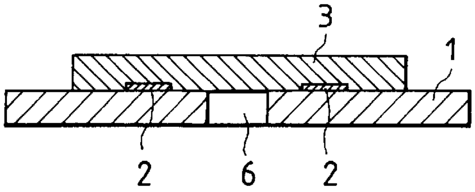

The resin layer was pre-baked at 120° C. for 20 minutes. Then the resin layer was exposed in a pattern of liquid path for 1.5 minutes by means of a mask aligner, PLA 520 (manufactured by Canon K.K., Cold Mirror CM 290). Development was conducted by spraying of 1% sodium hydroxide solution. The pattern 3 of the soluble resin secures the ink path between the ink supply opening 6 and the electrothermal elements 2 (FIG. 10). The thickness of the resist after the development was 10 μm.

Figure 11:
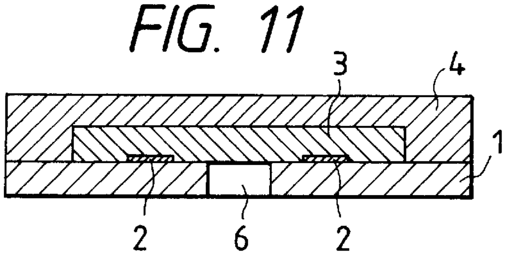

Thereon, a photosensitive coating resin layer 4 was formed by spin coating with a solution of a resin composition shown below in a mixed solvent of methyl isobutyl ketone and diglyme (layer thickness: 10 μm on the pattern 3, FIG. 11).

(Coating resin layer)

Epoxy resin, EHPE-3150 (trade name; mfd. by Daicel Chemical Ind., Ltd.)

Diol, 1,4-HFAB (trade name: mfd. by Central Glass Co., Ltd.)

Silane coupling agent, A-187 (trade name: mfd. by Nippon Unicar Co., Ltd.)

Photopolymerization initiator, Adeka Optomer SP-170 (trade name; mfd. by Asahi Denka Kogyo K.K.)

Figure 12:
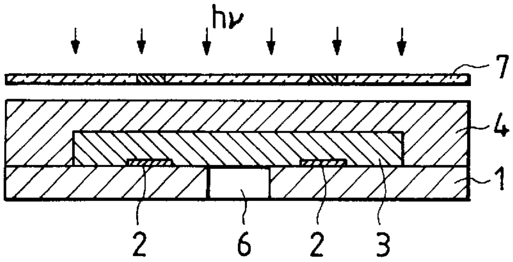
Figure 13:
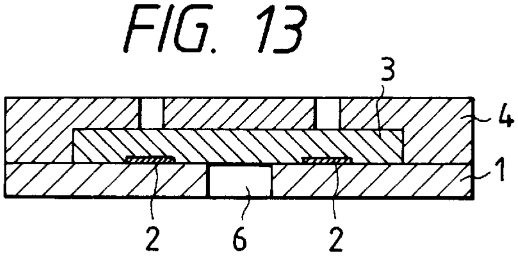

The formed coating layer was exposed in a pattern through a mask 7 for forming ink discharging openings by means of PLA 520 (CM 250) (FIG. 12). The exposure time was 10 seconds. After-baking was conducted at 60° C. for 30 minutes. Then development was conducted with methyl isobutyl ketone to form the ink discharge openings 5 above the electrothermal transducers 2. In this Example the pattern was made to form discharge openings of 25 μm diameter (FIG. 13).

Under the aforementioned development conditions, the liquid path pattern 3 completely remains undeveloped.

Usually plural heads in the same shape or different shapes are arranged on the substrate 1. The respective heads are separated by cutting with a dicer or a like means in this stage to obtain individual liquid-jet recording heads. The presence of the liquid path pattern 3 remaining as mentioned above prevents penetration of cutting dusts into the heads.

Figure 14:
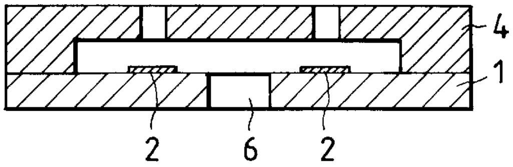

The resulting liquid-jet recording head was again exposed for 2 minutes by means of PLA 520 (CM 290). Then it was immersed into methyl lactate with application of ultrasonic wave to remove the remaining liquid path pattern 3 by dissolution (FIG. 14).

The liquid-jet recording head was heated at 150° C. for one hour to cure completely the photosensitive coating material layer 4.

Figure 15:
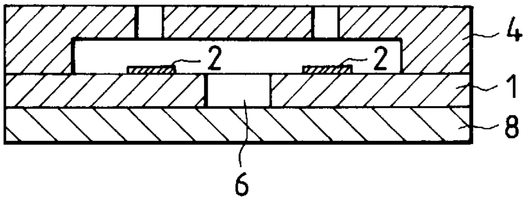

Finally an ink supply member 8 was bonded to the ink supply opening 6 to complete the liquid-jet recording head as shown in FIG. 15.

In such a manner, 20 liquid-jet recording heads were prepared. In any of the recording heads, no residue of the solid layer was found in the liquid paths. The formed orifices had the same shape as the developed solid layer before the lamination of the liquid path forming material. No damage such as swelling, cracking, or separation from the substrate was caused in the liquid path forming material. The prepared liquid-jet recording heads were mounted on a recording apparatus, and were employed in recording with an ink-jet ink composed of pure water, glycerin, diethylene glycol, urea, sodium hydroxide, isopropyl alcohol, and Direct Black 154 (water-soluble black dye) in the weight ratio of 76:5:5:5:1:4:4. Consequently, printing could be conducted stably.

COMPARATIVE EXAMPLE 1

Liquid-jet recording heads were prepared in the same manner as in Example 1 except that N-methyl-2-pyrrolidone was used in place of methyl lactate for removal of the positive resist. As the results, swelling of the liquid path forming material and minute separation thereof from the substrate were observed in every liquid-jet recording head. The printing was conducted in the same manner as in Example 1 with the obtained recording heads. However, no head gave satisfactory printing.

COMPARATIVE EXAMPLE 2

Liquid-jet recording heads were prepared in the same manner as in Example 1 except that acetone was used in place of methyl lactate for removal of the positive resist. As the results, cracking of the liquid path forming material and minute separation thereof from the substrate were observed in every liquid-jet recording head. The printing was conducted in the same manner as in Example 1 with the obtained recording heads. However, no head gave satisfactory printing.

COMPARATIVE EXAMPLE 3

Liquid-jet recording heads were prepared in the same manner as in Example 1 except that dimethylsulfoxide was used in place of methyl lactate for removal of the positive resist. As the results, minute separation of the liquid path forming material from the substrate were observed in every liquid-jet recording head. The minute separation was found to be caused by damages of the organic material for protecting the wirings and the like. The printing was conducted in the same manner as in Example 1 with the obtained recording heads. However, no head gave satisfactory printing.

ADDITIONAL EXAMPLES

A liquid-jet recording head and a liquid-jet recording apparatus of the present invention is explained below.

Figure 7:
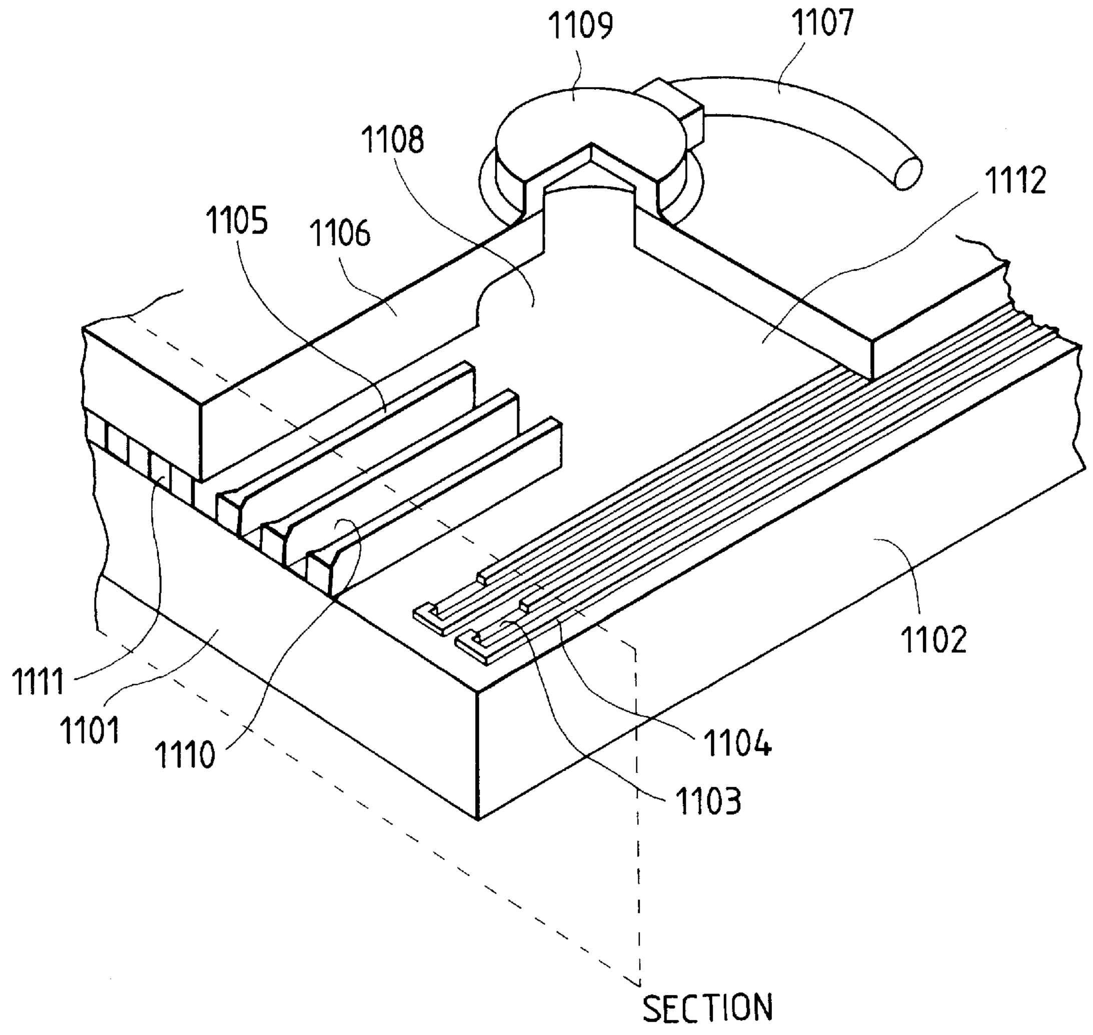
FIG. 7 shows roughly an example of constitution of a liquid-jet recording head to which the present invention is applied.

FIG. 7 illustrates roughly constitution of a liquid-jet recording head of the present invention. The ink jet head is produced through a semiconductor production process including steps of etching, vapor deposition, sputtering, and so forth, and has a substrate 1102, electrothermal transducers 1103, wirings 1104, liquid path walls 1105, and a cover plate 1106. A recording liquid 1112 is supplied from a liquid reservoir (not shown in the drawing) through a liquid supplying tube 1107 into a common liquid chamber 1108 in the head 1101. In FIG. 7, the numeral 1109 indicates a connector for the liquid supplying tube. The supplied liquid 1112 in the common liquid chamber 1108 is delivered by capillarity to liquid paths 1110, and is held stably by meniscus formation at the liquid discharge opening face (orifice face) at the tips of the liquid paths. In this state, electric current application to the electrothermal transducers 1103 causes abrupt heating of the liquid on the electrothermal transducer faces to form bubbles. The liquid is discharged from discharge openings 1111 by expansion and constriction of the bubbles to form liquid droplets.

Figure 8:
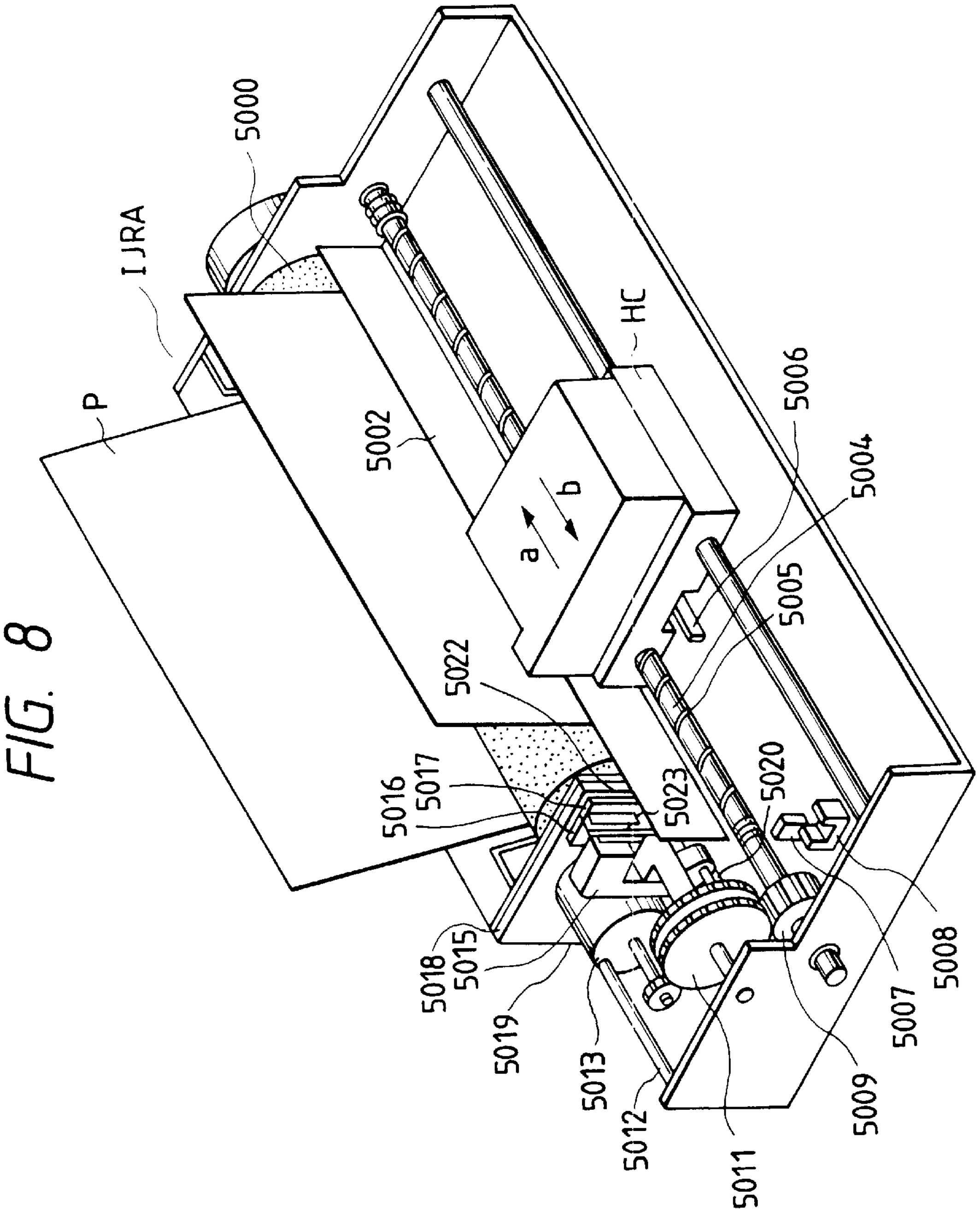
FIG. 8 is a perspective view of an example of a liquid-jet recording apparatus of the present invention.

FIG. 8 is a diagrammatic perspective view of a liquid-jet recording apparatus employing the present invention. A lead screw 5005 is interlocked with a driving motor 5013 through transmission gears 5011, 5009, and a carriage HC is engaged through a pin (not shown in the drawing) with a grooved screw 5004 of the lead screw 5005. Thus the carriage HC is driven in the directions shown by arrows a and b in accordance with the normal and reverse rotation of the motor. A paper sheet pressor plate 5002 presses a paper sheet against a platen 5000 over the entire range of the movement of the carriage HC. Photo-couplers 5007, 5008 serve as home position detection means to detect a lever 5006 of the carriage for switching the motor rotation direction. A supporting member 5016 supports a capping member 5022 for capping the front face of the recording head. A sucking member 5015 sucks the recording head through an opening 5023 in the cap to recover it. A cleaning blade 5017 is allowed to move back and forth by a member 5019, and these are supported by a supporting plate 5018 of the main body of the apparatus. The shape of the blade is not limited to the one shown here, but any known cleaning blade may be employed in this example. A lever 5012 for starting the recovery sucking moves with the movement of a cam 5020 engaging with the carriage. The movement is controlled by driving force of the motor by a known transmission means such as a switching clutch.

The means for capping, cleaning, and recovery sucking are constructed to conduct the desired treatment by action of the leading screw 5005 when the carriage comes to the home position. The types of the above means are not limited in the present invention provided that the means can be driven as desired at a desired timing. The above constitutions are respectively, or in combination, valuable inventions, and are shown as preferred constitution examples for the present invention.

The apparatus of this example has a driving signal applying means for driving the ink discharge pressure generating element.

The effects brought about by the present invention as explained above are enumerated below:

(1) The solid layer can be removed in a short time, whereby liquid-jet recording heads are produced at a lower cost.

(2) The liquid path forming material and the organic material for protecting the wiring and the like are damaged little, whereby liquid-jet recording heads are produced with high reliability without swelling or crack formation of these materials.

(3) The solvents employed have a low vapor pressure at room temperature, whereby the vaporization loss is less and it is advantageous in safety and hygiene.

(4) The solvents have a high flash point, not causing a fire.

(5) The main process of the head production is based on the so-called printing technique, that is, a fine working technique employing a photoresist, whereby fine heads can readily be formed in a desired pattern, and a number of heads of the same constitution can be worked simultaneously.

(6) The head constituting material has high adhesiveness and high mechanical strength, even in the presence of a recording liquid containing an aqueous corrosive and/or erosive solution or an organic solvent, whereby the recording apparatus is highly durable and highly reliable.

(7) The main constituting parts can readily and surely be registered positionally to produce heads with high dimensional precision at a high yield.

(8) Liquid-jet recording heads of high density and multi-array can be produced in a simple method.

(9) The thickness of the groove wall for forming the liquid path can be adjusted readily by controlling the pattern of the solid layer to form the liquid paths in a desired dimension.

(10) The heads can be mass-produced continuously.

(11) No etching solution (strong acid such as hydrogen fluoride) is especially used, and therefore the process is advantageous in safety and hygiene.

What is claimed is:

1. A process for producing a liquid-jet recording head, comprising the steps of:

providing a solid layer of a photosensitive material in a pattern of a liquid path on a substrate, the substrate having an ink discharge energy generating element provided thereon, the photosensitive material comprising a positive resist which is solubilized by active rays;

providing at least a portion of a liquid path forming material on the substrate having the solid layer, the liquid path forming material comprising a resin;

forming a discharge opening in the liquid path forming material above the ink discharge energy generating element provided on the substrate; and removing the solid layer from the substrate, wherein the solid layer is removed by use of at least one of methyl lactate, ethyl lactate, and butyl lactate, or a solvent which contains as a main component at least one of methyl lactate, ethyl lactate, and butyl lactate.

2. The process for producing a liquid-jet recording head according to claim 1, wherein the liquid path forming material is an epoxy resin.

3. The process for producing a liquid-jet recording head according to claim 1, wherein the solid layer is made from a positive resist, and the liquid path forming material is an epoxy resin.

* * * * *

UNITED STATES PATENT AND TRADEMARK OFFICE

CERTIFICATE OF CORRECTION

PATENT NO. : 6,123,863

DATED : September 26, 2000

INVENTOR(S) : AKIHIKO SHIMOMURA ET AL.

It is certified that error appears in the above-identified patent and that said Letters Patent is hereby corrected as shown below:

COLUMN 1

Line 38, "commonly" should read --common--.

Signed and Sealed this

Eighth Day of May, 2001

Attest:

Nicholas P. Godici

NICHOLAS P. GODICI

*Attesting Officer*

*Acting Director of the United States Patent and Trademark Office*